United States Patent [19]

Gallios

[11] 4,442,482

[45] Apr. 10, 1984

[54] DUAL OUTPUT H.V. RECTIFIER POWER SUPPLY DRIVEN BY COMMON TRANSFORMER WINDING

[75] Inventor: George C. Gallios, Setauket, N.Y.

[73] Assignee: Venus Scientific Inc., Farmingdale, N.Y.

[21] Appl. No.: 429,449

[22] Filed: Sep. 30, 1982

[51] Int. Cl.³ .............................................. H02M 7/02
[52] U.S. Cl. ...................................................... 363/61
[58] Field of Search ............................ 363/60, 61, 126

[56] References Cited

U.S. PATENT DOCUMENTS 4,109,306  8/1978  Mason .................................... 363/61

OTHER PUBLICATIONS

Longacre, A., Jr., "Voltage Doublers Power Microprocessor Proms", *Electronics*, vol. 49, No. 19, p. 105, Sep. 16, 1976.

*Primary Examiner*—William M. Shoop
*Attorney, Agent, or Firm*—Ostrolenk, Faber, Gerb & Soffen

[57] ABSTRACT

A high voltage power supply that produces a relatively high current at a relatively low voltage D.C. output and a relatively low current at a relatively high voltage D.C. output is driven from a common transformer winding. The low voltage is produced by a rectifier bridge and the high voltage is produced by a full wave voltage doubler type circuit that includes rectifier elements of the bridge. However, the high voltage main storage capacitor is isolated from low voltage currents and the low voltage main storage capacitor is isolated from high voltage currents.

6 Claims, 1 Drawing Figure

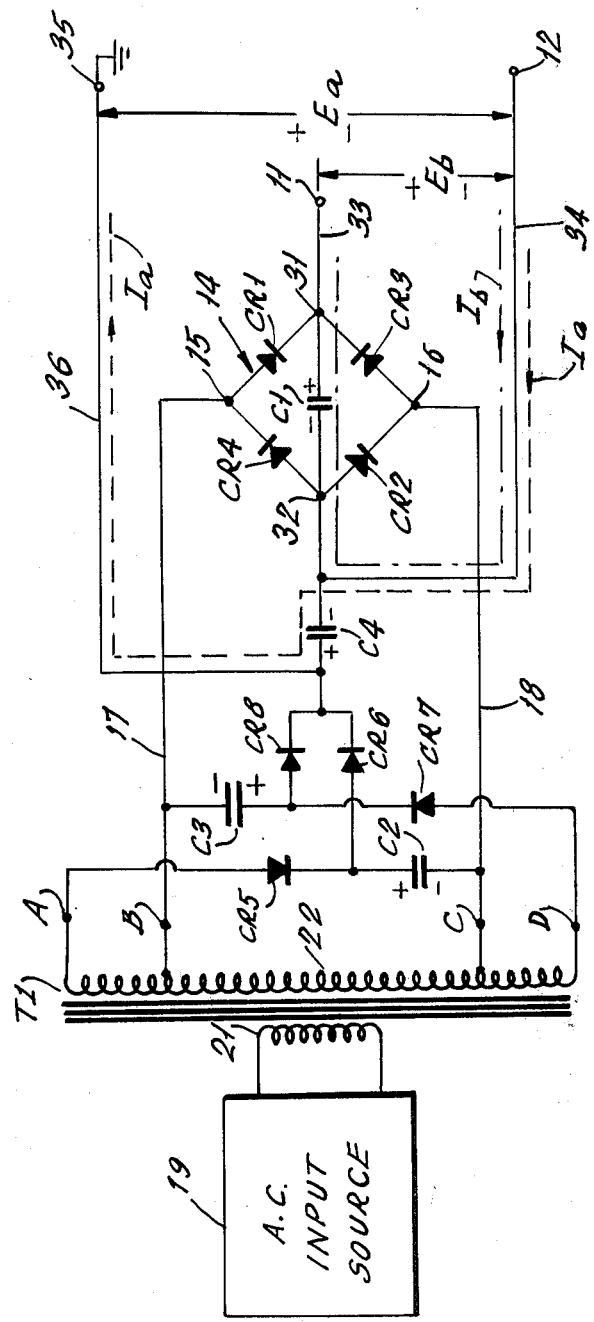

DUAL OUTPUT H.V. RECTIFIER POWER SUPPLY DRIVEN BY COMMON TRANSFORMER WINDING

This invention relates to rectifier type power supplies in general and more particularly relates to power supplies of this type for producing dual relatively high voltage outputs for electronic equipment.

In the construction of modern electronic equipment requiring relatively high voltages, size reduction and a reduction in the number of components used are primary considerations which the prior art has found difficulty in dealing with. In particular, difficulties have arisen when constructing power supplies having relatively high and low voltage outputs that are referenced to one another and in which the current delivered by the low voltage output is many times greater than the current delivered by the high voltage output especially when requirements of low ripple and good voltage regulation are required of the higher output voltage. A typical application for this type of dual output power supply is a traveling wave tube which requires a high negative cathode voltage, say 3700 volts, at relatively low current with low ripple and good regulation, and a relatively low voltage, say 1900 volts, for the collector to cathode where the current is in the order of ten times the current at relatively high voltage, the ripple and regulation requirements for the lower voltage being much less stringent than for the higher voltage.

In order to produce the foregoing type output voltages the prior art has often taken a brute force approach in which the transformer supplying energy to the power supply is provided with individual secondary windings that are totally isolated from one another to produce the individual output voltages. In an attempt to economize on transformer size, the prior art has also provided circuit configurations wherein a common secondary winding is utilized in producing both output voltages. However, this has proven to be wasteful in terms of the number of components, principally because blocking capacitors must be included, and perhaps more importantly rectifier components sizes have been excessive especially when the voltages being produced are in excess of 600 volts. The latter problem increases when the ripple and regulation requirements of the higher voltage output are much greater than for the lower voltage output, and the problem becomes more difficult of solution when the current requirements for the lower voltage output are many times greater than the higher voltage output.

In order to overcome the foregoing problems of the prior art, the instant invention utilizes common portions of a transformer secondary winding to energize both the high and low voltage rectifier sections. The low voltage section is a conventional bridge rectifier and the high voltage section includes a full wave voltage doubler type circuit. The high and low voltage sections are interconnected in a manner such that while high voltage currents flow through rectifier elements of the bridge, these currents are isolated from the main storage capacitor across the output of the bridge, and the low voltage currents are isolated from the main storage capacitor across the high voltage output. This concept eliminates the necessity for a number of capacitors and/or permits capacitors of reduced ratings, hence reduced size and weight, to be used at many points in the circuit.

Accordingly, a primary object of the instant invention is to provide a novel construction for a high voltage power supply having coupled outputs in which one output is of relatively high voltage low current and the other output is of relatively low voltage high current.

Another object is to provide a power supply of this type which utilizes much of the same secondary winding to energize both rectifier sections.

Still another object is to provide a power supply of this type in which the number and sizes of the rectifier and/or capacitor elements is significantly reduced.

A further object is to provide a power supply of this type which obtains good voltage regulation and ripple voltage reduction for the high voltage section in spite of substantial changes in low voltage currents.

A still further object is to provide a power supply of this type that is of high reliability, is compact, lightweight and of reduced cost.

These objects as well as other objects of this invention shall become readily apparent after reading the following description of the accompanying FIGURE which is an electrical schematic of a dual output power supply constructed in accordance with teachings of the instant invention.

Now referring to the FIGURE, relatively low voltage output $E_b$ appearing between positive terminal 11 and common terminal 12 is produced by conventional rectifier bridge 14 having its input terminals 15 and 16 connected by the respective lines 17, 18 to the respective taps B, C of secondary winding 22. The latter is part of transformer T1 and is magnetically coupled to primary winding 21 of transformer T1. Primary winding 21 is energized by A.C. input source 19. Bridge 14 also includes positive output terminal 31 connected directly to low voltage terminal 11 by conductor 33 and negative output terminal 32 connected directly to common terminal 12 by conductor 34. Main storage capacitor C1 is connected directly across output terminals 31, 32. One charging path for capacitor C1 is through rectifiers CR1 and CR2, the former being connected between terminals 15 and 31 and the latter being connected between terminals 32 and 16. The other charging path for main capacitor C1 is through rectifiers CR3 and CR4, with rectifier CR3 being connected between terminals 16 and 31 and rectifier CR4 being connected between terminals 32 and 15. The load current between terminals 11, 12 is indicted by the broken line $I_b$.

The relatively high voltage output $E_a$ appears between common terminal 12 and positive grounded terminal 35. The latter is connected by conductor 36 to the positive terminal of main storage capacitor C4 whose negative terminal is connected through line 34 to common terminal 12. The path for high voltage load current is indicated by the dashed line $I_a$.

Secondary winding 22 of transformer T1 also includes terminal A located outboard of terminal B, and terminal D located outboard of terminal C. When terminal A is positive, main capacitor C4 is charged through a circuit consisting of line 17 connected to terminal B, auxiliary capacitor C3, charging rectifier CR8, rectifier element CR2 of bridge 14, and conductor 18 to transformer terminal C. While this is occurring, auxiliary capacitor C2 is being charged through auxiliary rectifier CR5 to the voltage appearing between terminals A and C. When the polarity on transformer winding 22 reverses, that is when terminal D is positive with respect to terminal A, the charging path for main capacitor C4 extends between terminals B and C and consists of line 18 extending from terminal C, auxiliary capacitor C2, charging rectifier CR6, and rectifier element CR4 of bridge 14 connected by conductor 17 to terminal B. While this is occurring, auxiliary capacitor C3 is being charged through auxiliary rectifier CR7 to the voltage appearing between transformer terminals B and D.

The voltage between transformer terminals A and B is equal to the voltage between transformer terminals C and D. Thus, main storage capacitor C4 is charged by a potential equal to the algebraic sum of the voltage between terminals A and B and twice the voltage between terminals B and C. It should now be apparent to those skilled in the art that main capacitor C4 is part of what can be termed a voltage doubler type circuit. High voltage output $E_a$ may be increased by increasing the voltage between terminals A and C maintaining this voltage substantially equal to the voltage between terminals B and D. Conversely, high voltage $E_a$ may be decreased by decreasing the voltages between winding terminals AC and BD. The voltages $E_a$ and $E_b$ will be equal when the voltages across each of the auxiliary capacitors C2 and C3 is equal to approximately one half the output voltage of bridge 14. It is noted that the circuit hereinbefore described will work equally as well while producing a higher voltage between terminals 12 and 35 if the connection from auxiliary capacitor C2 to terminal C is moved to terminal D and the connection from auxiliary capacitor C3 to terminal B is moved to terminal A.

To achieve other voltage relationships, the circuit illustrated may be modified as follows:

(1) For voltage $E_b$ to be a negative voltage referenced to the positive output terminal of $E_a$, all of the rectifier polarities must be reversed.

(2) For voltage $E_a$ to be positive and referenced to ground and voltage $E_b$ to be positive with reference to ground, the connections of output lines 34 and 36 to main capacitor C4 must be reversed from those connections illustrated in the FIGURE.

(3) To have voltage $E_b$ negative and voltage $E_a$ negative and with both of these voltages referenced to ground, interchange the connections of output lines 34 and 36 at C4 as in the preceeding paragraph (2), and reverse the polarities of all rectifiers.

(4) To change the reference point of those circuits described above in which voltage $E_b$ is referenced to voltage $E_a$, by moving ground from terminal 35 to terminal 11 voltage $E_a$ will be referenced to voltage $E_b$.

It should also now be apparent to those skilled in the art that by eliminating main capacitor C1 and bridge rectifier elements CR1 and CR3 the remaining circuit is effectively a voltage doubler. Although the output voltage between terminals 12 and 35 will not be precisely twice the voltage between transformer terminals BC but is also a function of the potential between terminals AB and CD.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A power supply including a transformer having magnetically coupled primary and secondary winding means; a rectifier-capacitor type first circuit energized by said secondary winding means to produce a first output voltage; a rectifier-capacitor type second circuit energized by said secondary winding means to produce a second output voltage referenced to said first output voltage; said first circuit including a first main capacitor across which said first output voltage appears and said second circuit including a second main capacitor across which said second output voltage appears; said secondary winding means including a common winding portion through which charging currents for both said first and second main capacitors flow; said charging current for said first main capacitor by-passing said second main capacitor; said charging current for said second main capacitor flowing through rectifier elements of said first circuit while by-passing said first main capacitor; said second circuit having a full wave voltage doubler type configuration.

2. A power supply as set forth in claim 1 in which there is a first section of said second circuit for charging said second main capacitor during alternate half cycles of voltage produced by said secondary winding means and a second section of said second circuit for charging said second main capacitor during the remaining alternate half cycles of voltage produced by said secondary winding means; each of said first and second sections including an auxiliary capacitor and a charging rectifier connected in series between said second main capacitor and said second secondary winding means; each of said first and second sections being connected with an individual auxiliary rectifier through which said auxiliary capacitor is charge while said charging rectifier blocks flow of charging current between said auxiliary capacitor and said second main capacitor.

3. A power supply as set forth in claim 2 in which said secondary winding means is provided with first, second, third and fourth terminals, there being a voltage difference between said first and third terminals equal substantially to a voltage difference existing between said second and fourth terminals; said first circuit being connected across said first and second terminals; said auxiliary capacitor of said first section having a charging path connected across said second and third terminals and said auxiliary capacitor of said second section having a charging path connected across said first and fourth terminals; said first and second sections being connected across said first and second terminals.

4. A power supply as set forth in cliam 2 or 3 in which said rectifier elements of said first circuit constitute first and second legs of a rectifier bridge; each of said legs extending from a different input terminal of said bridge and connected to a common output terminal of said bridge.

5. A power supply as set forth in claim 3 in which there is a voltage difference between said first and third terminals that is in the range of 0.5 to 2.0 times a voltage difference beween said first and second terminals.

6. A power supply as set forth in claim 3 in which the second output voltage is greater than said first output voltage and the latter is at least 600 volts.

* * * * *